(12) United States Patent
Solotorevsky

(10) Patent No.: US 10,762,434 B2
(45) Date of Patent: *Sep. 1, 2020

(54) METHOD AND SOFTWARE FOR OBTAINING ANSWERS TO COMPLEX QUESTIONS BASED ON INFORMATION RETRIEVED FROM BIG DATA SYSTEMS

(71) Applicant: Amdocs Development Ltd., Limassol (CY)

(72) Inventor: Gad Nir Solotorevsky, Even Yehuda (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 1057 days.

This patent is subject to a terminal disclaimer.

(21) Appl. No.: 14/589,170

(22) Filed: Jan. 5, 2015

(65) Prior Publication Data

US 2016/0196301 A1 Jul. 7, 2016

(51) Int. Cl.
| | |
|---|---|
| G06F 16/242 | (2019.01) |
| G06N 20/00 | (2019.01) |
| G06F 16/28 | (2019.01) |
| G06F 16/9535 | (2019.01) |

(52) U.S. Cl.
CPC ........... *G06N 20/00* (2019.01); *G06F 16/242* (2019.01); *G06F 16/285* (2019.01); *G06F 16/9535* (2019.01)

(58) Field of Classification Search
CPC ......... G06F 17/30864; G06F 17/30554; G06F 17/2785; G06F 17/30917; G06F 17/30997; G06F 16/9535; G06F 16/243; G06F 16/3329; G06F 16/2445

USPC ................ 707/713, 718, 721–722, 765, 768
See application file for complete search history.

(56) References Cited

U.S. PATENT DOCUMENTS

| | | | | |
|---|---|---|---|---|
| 8,533,148 B1* | 9/2013 | Feuersanger | .......... | G06N 20/00 706/62 |
| 8,694,488 B1* | 4/2014 | Garg | ................... | G06F 17/3064 707/721 |
| 2006/0112090 A1* | 5/2006 | Amer-Yahia | ....... | G06F 17/3053 |
| 2006/0265697 A1* | 11/2006 | Ali | .......................... | G06F 8/75 717/141 |
| 2013/0290294 A1* | 10/2013 | Fuller | ................. | G06F 16/2425 707/714 |

(Continued)

*Primary Examiner* — Tamara T Kyle
*Assistant Examiner* — Berhanu Mitiku
(74) *Attorney, Agent, or Firm* — Zilka-Kotab, P.C.

(57) ABSTRACT

A method is provided for enabling a software user to obtain answers based on information retrieved from Big Data systems to complex questions, which comprises the steps of: providing a plurality of queries associated with different query families, the different query families comprise at least one family of simple queries and at least one query family of complex query family, and each of the families is associated with the following characterizing elements: information sources, entity type for which one or more features would be synthesized, attributes to be used as filters and attributes for calculating the new features; retrieving data from the respective information sources; processing the retrieved data to enable evaluating results of the queries associated with the at least one simple query families; calculating solutions to all queries and synthesizing features characterizing the answers, based on the calculated solutions.

16 Claims, 1 Drawing Sheet

(56) References Cited

U.S. PATENT DOCUMENTS

2014/0040292 A1* 2/2014 Basak ................ G06F 16/245
                                                    707/756
2016/0012105 A1* 1/2016 Chang ................ G06F 16/243
                                                    707/706
2017/0039656 A1* 2/2017 Drennan, III ......... G06Q 40/08

* cited by examiner

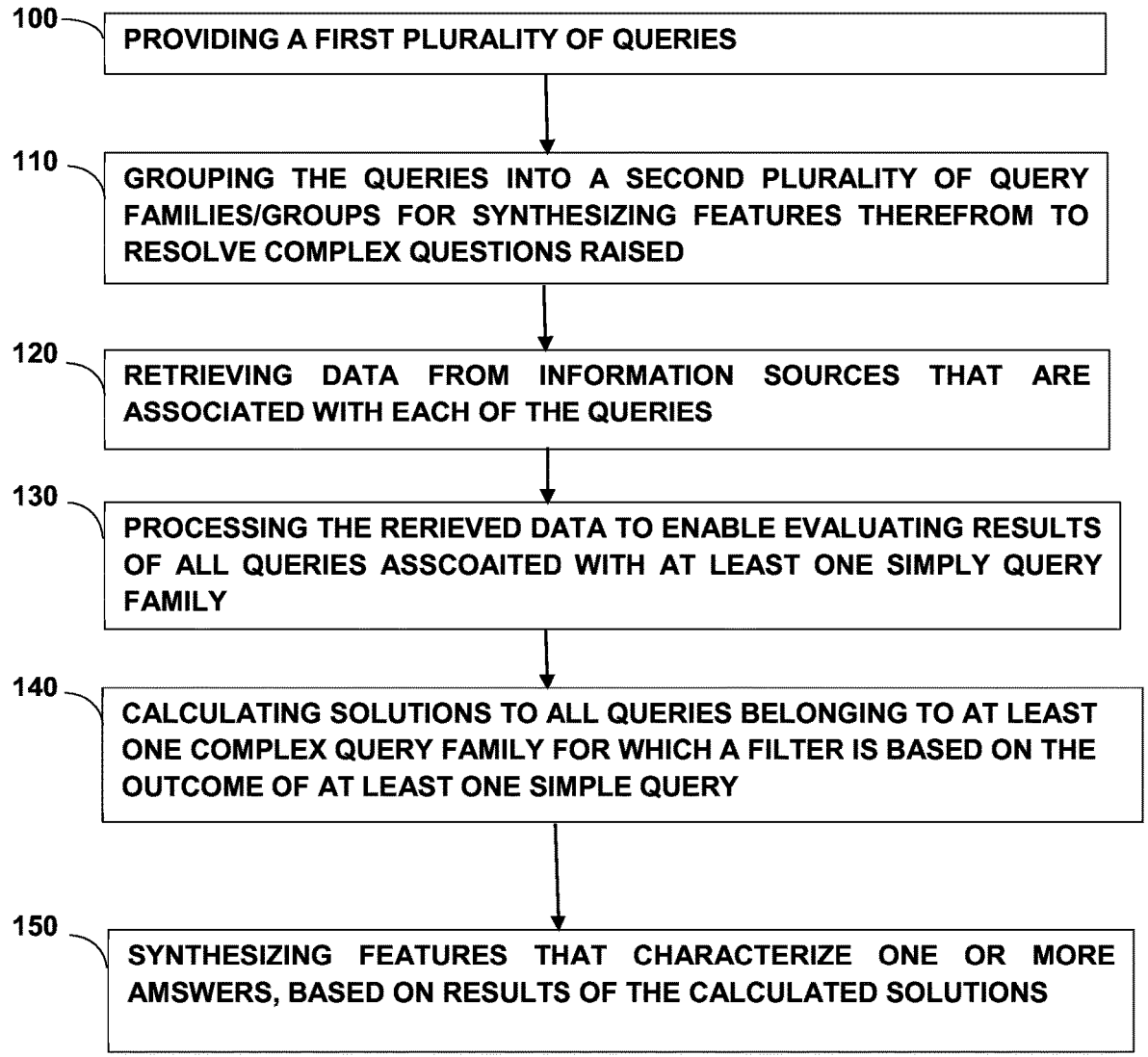

METHOD AND SOFTWARE FOR OBTAINING ANSWERS TO COMPLEX QUESTIONS BASED ON INFORMATION RETRIEVED FROM BIG DATA SYSTEMS

TECHNICAL FIELD

The present invention relates to methods and software for obtaining answers to complex questions based on information retrieved from Big Data systems, and in particularly but not exclusively, the present invention relates to methods and software that enable generating a set of features by using various types of queries.

BACKGROUND

Features represent the characteristics of objects, and selecting or synthesizing composite features are the key to object recognition.

Working with an appropriate set of features is crucial for the success of machine-learning, artificial intelligence, and data mining algorithms/processes. For the convenience of the reader, the term "machine-learning" will be used hereinafter and should be understood to encompass machine-learning as well as artificial intelligence and data mining. Typically, obtaining such an appropriate set of features involves three steps, features extraction, features generation, and features selection.

Features extraction is used when there is a too vast amount of raw data for the machine-learning algorithm to operate on. Therefore, in this step, data is compressed to a subset of features. For example, in a telecommunication field of technology, raw data that is used may comprise all the Call Detailed Records (CDRs) available for the telecom operator, from which it is possible to extract features such as the number of phone calls that were made by a subscriber within a period of time (e.g. within the last month), or the total number of minutes that the subscriber used his telephone device during the last week for voice calls.

The step of features generation is in fact a process of generating new features by applying functions on existing or extracted features, in order to generate new dependent features. Let us revert to the previous telecommunication example, one may generate a new feature the average duration of a call of a subscriber during the period of last month, by using two extracted features, the number of calls the subscriber made, and the duration of these calls.

Features selection is a process of selecting a subset from all the extracted and generated features for use in the machine-learning process of building a model or predictor. The process of features selection enables disposing redundant or irrelevant features, which may cause undesired phenomena when using machine-learning algorithms for constructing the model. Moreover, many machine-learning techniques have limitations (e.g., due to complexity) on the amount of features they can handle effectively. Features selection permits reducing the amount of features to a volume manageable by the machine-learning algorithm. It should be noted that since redundancy considerations are a key aspect in the process of features selection, features are selected while considering which other features are selected; therefore the best practice is to carry out the features selection process after completing the phases of features extraction and features generation.

It is important to denote that even though many machine-learning algorithms practically require the use of relatively small sets of features, creating a rich universe of features by features extraction and generation and then using features selection to pick a preferred sub-set is very important factor for the machine-learning process to be successful.

In many domains it is not clear which features will be the most beneficial ones. Therefore, it is desired to extract and generate a very large set of features, which will be pruned at the selection stage. However in many domains, for example domains that include temporal relations between entities and large amounts of data, generating the multitude features by using the existing state of art methods, is impractical. For example, let us assume that one has a set of 100 billion CDRs corresponding to call records of 30 Million subscribers over a period of one year, and this information is to be used by applying machine-learning techniques to identify families among the subscribers. Without a priory information regarding which features might be important for building the desired model, it would be preferred to extract for each subscriber a rich set of features. Such set of features may be for example, what is the subscriber's average number of calls, what is his average number of calls on Saturdays between 8 and 10 AM, who are the 3 subscribers he called most during last month, who are the 3 subscribers with whom he spoke the highest number of minutes on Sundays between 4-6 PM over the last year, which is the location from which the subscribers made most of the calls last week, etc. Hundreds or even thousands of such features would be extracted and then be later used for features generation and features selection.

Given the volume of data, its complexity (temporal and link relations) and the number of features, the straightforward approach of "running a query" per feature, is simply impractical.

Therefore, a solution is required to overcome the problem of extracting large amounts of features, by carrying out effective features synthesis processes thereon.

SUMMARY OF THE DISCLOSURE

The disclosure may be summarized by referring to the appended claims.

It is an object of the present invention to provide methods and software for obtaining answers to complex questions defined by users, based on information retrieved from Big Data systems.

It is still another object of the present invention to provide methods and software to enable providing answers to targets set by the users under real time (or at least near real time) conditions, while retrieving data from big data systems.

Other objects of the present invention will become apparent as the description of the invention proceeds.

According to one embodiment, there is provided a method for enabling a software user to obtain one or more answers based on information retrieved from one or more Big Data systems to one or more complex questions defined by a user, the method comprises the steps of:

providing a first plurality of queries associated with a second plurality of different query families, wherein the second plurality of different query families comprises at least one family of simple queries and at least one query family of complex query family, and each of the different query families is associated with at least the following characterizing elements: one or more information sources, entity type for which one or more features would be synthesized, one or more attributes configured to be used as filters and one or more attributes configured for calculating features that characterize the one or more answers;

retrieving data from the one or more respective information sources, wherein at least one of the one or more information sources is a Big Data system, processing the retrieved data to enable evaluating results of all queries associated with the at least one simple query families, preferably, by performing a single pass (review) of the data retrieved; and calculating solutions to all queries of each of the second plurality of query families and synthesizing features that characterize the one or more answers, based on outcomes of the calculated solutions.

The term a "complex query family", as used hereinafter throughout the description and claims to a query family associated with a filter that depends on the results of one or more other simple and/or complex query families.

According to another embodiment, at least one attribute configured to be used as a filter associated with a complex query family (from among the at least one complex query family), is a result of one or more simple queries.

In accordance with another embodiment, the method provided further comprises a step of combining queries associated with the same query family, to enable reducing computational resources.

By yet another embodiment, data retrieved from one or more information sources, being one or more Big Data systems, relates to activities of a plurality of users at the Internet.

According to still another embodiment, the data retrieved from one or more information sources, being one or more Big Data systems, relates to details of voice calls or text messages associated with a plurality of users.

In accordance with another embodiment, the synthesized features are used for any one or more of the following purposes: a machine-learning process, data mining, artificial intelligence adapted to generate insights and/or actionable plans, in a variety of business and production tools such as reports, dashboards, and the like.

According to yet another embodiment, the one or more information sources comprise at least one member of a group that consists of: social media data (e.g. tweets, face book posts and interactions, WhatsApp sessions), communications data (e.g., telephone calls, SMS, network events, Deep Packet Inspection ("DPI") data), consumption data (e.g., electricity consumption, goods purchasing history), customer related data (e.g., support calls, promotion calls), and any combination thereof.

By yet another embodiment, the processing of the data allows provisioning of answers to ad-hoc queries belonging to the same family that are currently formulated by a system/user.

According to another aspect of the disclosure there is provided a non-transitory computer-readable storage media storing one or more sequences of instructions which when executed cause one or more processors to:

a) retrieve a first plurality of queries associated with a second plurality of different query families, wherein the second plurality of different query families comprises at least one query family of simple queries and at least one query family of complex query family, and each of the different query families is associated with at least the following characterizing elements: one or more information sources, entity type for which one or more features would be synthesized, one or more attributes configured to be used as filters and one or more attributes configured for calculating the new features;

b) retrieve data from the respective one or more information sources, wherein at least one of the one or more information sources is a Big Data system;

c) process the retrieved data to enable evaluating results of all queries associated with the at least one simple query family;

d) calculate solutions to all queries of each of the second plurality of query families; and e) synthesize features that characterize the one or more answers to one or more complex questions defined by a user, based on outcomes of the calculated solutions.

According to another embodiment of this aspect of the disclosure, the information retrieved from one or more Big Data systems comprises data that relates to activities of a plurality of users at the Internet and/or data that relates to details of voice calls or text messages associated with a plurality of users.

In accordance with another embodiment at least one attribute which is configured to be used as a filter associated with a complex query family (from among the at least one complex query family), is the result of one or more simple queries.

By still another embodiment, the one or more sequences of instructions further comprises an instruction to combine queries associated with the same query family.

According to another aspect, there is provided a method for enabling a software user to obtain one or more answers based on information retrieved from one or more Big Data systems to a query defined by a user, the method comprises the steps of:

associating the query defined by the user with at least one query family, and wherein each of the at least one query family is associated with at least the following characterizing elements: one or more information sources, entity type for which one or more features would be synthesized, one or more attributes configured to be used as filters and one or more attributes configured for calculating features that characterize the one or more answers;

retrieving data from the one or more respective information sources, wherein at least one of the one or more information sources is a Big Data system, processing the retrieved data to enable evaluating results of all queries associated with the at least one query family; and calculating solutions to all queries of each of the at least one query family and synthesizing features that characterize the one or more answers, based on outcomes of the calculated solutions.

In accordance with another embodiment, the method provided further comprises a step of combining queries associated with the same query family, to enable reducing computational resources.

By yet another embodiment, data retrieved from one or more information sources, being one or more Big Data systems, relates to activities of a plurality of users at the Internet.

According to still another embodiment, the data retrieved from one or more information sources, being one or more Big Data systems, relates to details of voice calls or text messages associated with a plurality of users.

In accordance with another embodiment, the synthesized features are used for any one or more of the following purposes: a machine-learning process, data mining, artificial intelligence adapted to generate insights and/or actionable plans, in a variety of business and production tools such as reports, dashboards, and the like.

According to yet another embodiment, the one or more information sources comprise at least one member of a group that consists of: social media data (e.g. tweets, face book posts and interactions, WhatsApp sessions), communications data (e.g., telephone calls, SMS, network events, Deep Packet Inspection ("DPI") data), consumption data (e.g., electricity consumption, goods purchasing history), customer related data (e.g., support calls, promotion calls), and any combination thereof.

By yet another embodiment, the processing of the data allows provisioning of answers to ad-hoc queries belonging to the same family that are currently formulated by a system/user.

In accordance with another embodiment there is provided a non-transitory computer-readable storage media storing one or more sequences of instructions which when executed cause one or more processors to carry out the method of this aspect.

BRIEF DESCRIPTION OF THE DRAWING

For a more complete understanding of the present invention, reference is now made to the following detailed description taken in conjunction with the accompanying drawing wherein:

FIG. 1 presents a flow chart illustrating a flow chart of a method construed in accordance with an embodiment of the present invention.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

In the following description, the present invention is described while using the approaches of Big Data Hadoop and Map-Reduce HDFS (Hadoop Distributed File System). However, as any person skilled in the art would understand, these approaches are used for exemplifying the present invention and thus should not be considered as limiting the scope of the present invention. In other words, the present invention may be implemented on top of any data repository, e.g. Data base, columnar data base, file system, using any programing paradigm such as a programing language such as C++, java, or a query language such as SQL, and the like, as applicable.

Let us consider now FIG. 1 which is a flow chart illustrating a flow chart of a method construed in accordance with an embodiment of the present invention.

The flow chart illustrated in FIG. 1 presents a method for enabling a software user to obtain one or more answers to one or more complex questions defined based on information retrieved from one or more Big Data systems.

In step 100, a first plurality of queries is provided. These queries are grouped into a plurality of different query families (groups) (step 110). Some of the groups may comprise the one or more identical queries (i.e. the same query may appear in two or more groups), but obviously no two groups will contain the exact same queries as the other. Also, among these different query families there is at least one query family of simple 10 queries and at least one query family of complex query family. Each of the families is associated with at least the following characterizing elements: one or more information sources, entity type for which one or more features would be synthesized, one or more attributes configured to be used as filters and one or more attributes configured for calculating the new features.

Next, (step 120) for one or more of the various queries, data is retrieved from the one or more respective information sources defined for a query family with which a particular query from among the one or more various queries for which is to be retrieved, is associated.

The retrieved data is processed (step 130) to enable evaluating results of all queries associated with a simple query family that is associated with one of the queries for which data has been retrieved.

The result(s) obtained for at least one of the queries belonging to that simple query family is used to construct a filter that will be used when solutions are calculated for a complex query family step 140).

Steps 120-140 are repeated until there are no more unresolved queries

Based on the results obtained for the various query families, features that characterize the one or more answers to the complex questions(s) are synthesized (step 150).

In the following examples, the present invention will be exemplified as a process that comprises a series of steps, namely:

Selecting families of queries;
Data pre-processing;
Queries combination; and
Queries evaluation.

Step I—Selection of Families of Queries:

In this step, a set of queries is provided, and the queries are associated with different query families.

In certain embodiments of the invention, the queries provided are the result of an automatic query generation process/system that generates queries that relate to a specific domain. In other embodiments, these queries will be generated by a human expert, while in other embodiments part of the queries are generated by an automatic system while another part is generated by a human expert.

A simple family of queries is defined by:
1. Information sources. In this example, CDRs are the information source.
2. The entity type for which the features should be synthesized. In this example, the calling subscribers. Thus, for each calling number one or more features will be generated.
3. Attributes that may be used as filters, e.g., the day of the week that a call took place.
4. Attributes that may be used to calculate the new features. For example, duration of the telephone calls.

It should be noted however, that the last two characteristics, namely the attributes that may be used as filters and the attributes that may be used to calculate the new feature, may include common elements.

5. Results pruning (optional). In some cases, only part of the new features will be return, e.g. if the feature is a tuple (i.e. an ordered list) of the called telephone number, and the number of minutes that each telephone number has been called over the last year, the pruning might be used in order to return only x telephone numbers that were called over the last year that are associated with the highest number of minutes that these calls took place. Notwithstanding the above, it should be noted that each new feature may be pruned in a way that is different from that other features were pruned.

In all queries that belong to the same family of queries, the same information sources are used for synthesizing information that relates to the same entity type. The synthesized features are the result of applying one or more functions onto the elements. Different queries associated with the same family still may differ by any one or more of the following:

The attributes' subset that will be used in establishing the filter;

The attributes' subset that will be used in synthesizing the features;

The functions that will be used for calculating new attributes;

The number of synthesized attributes; and

The result obtained after carrying out a pruning process.

Example No. 1

This example refers to a simple query family as follows:
1. The information sources are Call details Records (CDRs);
2. The elements for which features should be synthesized are the subscribers' calling numbers;
3. The attributes that may be used in establishing the filters are: Date, Hour, day of Week;
4. The attributes that may be used to calculate the new features=minutes, and called numbers;
5. No pruning of the results is to be affected in this example.

Next, let us consider the following two queries that belong to this family of queries:

What is the aggregated number of minutes associated with each calling number of calls that were initiated on Saturdays between 8 and 10 AM, during the last month; and Who are the three subscribers with whom each calling number spent the largest aggregated number of minutes during the last month, in calls initiated by the respective calling number.

A query belonging to a simple query family, will be referred to herein as a simple query.

Example No. 2

This example refers to a complex query family, which is a query family whose filter depends on the results of one or more other simple and/or complex query families. In this example:
1. The information sources are Call details Records (CDRs);
2. The elements for which features should be synthesized are in this example the subscribers' calling numbers;
3. The attributes that may be used for establishing the filters are for example the day of the week, and/or the outcome of at least one or more legitimate queries (as defined hereinbelow), which may be used as filters. A filter belonging to a complex query family will be referred to as a complex filter, and such a complex filter may be for example the three subscribers with whom each calling number spent the largest aggregated number of minutes during the last month, in calls initiated by the respective calling number. In other words, the result of the simple query, exemplified in example No. 1.
4. An example of one of the elements that may be used to synthesize the attributes of this example, is the duration of the calls. It should be noted that at least one of the attributes that are used for establishing the filters may also be the very same element(s) used for synthesizing the attributes.
5. The decision on whether to affect a pruning step of the results obtained, is optional in this example.

The term "legitimate query" as a used herein throughout the specification and claims is used to denote a query that can be mapped into a query family (either a complex query family or a simple query family).

Also, it should be noted that recursive or cyclic complex query families definitions are not allowed, in accordance with the method provided herein.

Example No. 3

In this example:
1. The information sources are Call details Records (CDRs);
2. The elements for which features should be synthesized are in this example the subscribers' calling numbers;
3. The elements/attributes that may be used as filters, are for example, the period of last week, subscribers with whom the respective subscriber, who initiated the calls, has been engaged in calls for at least 180 minutes (aggregated) the day before;
4. An example of one of the elements that may be used to synthesize the attributes of this example, is the duration of the calls. It should be noted that at least one of the attributes that are used for establishing the filters may also be the very same element(s) used for synthesizing the attributes.
5. Pruning of the results may be done for example by searching the three called subscribers associated with the highest duration of calls as calculated in the new feature.

In the phase of selecting queries' families, a set of queries is received, and then a decision process is carried for each of them, such as the following one:

For a set Q of queries that is not empty,
1. Selecting a query q out of the set Q of queries;
2. Delete query q from the set Q;
3. If q is a legitimate query then a check will be conducted in order to determine whether query q belongs to an already defined query family;
   a. If query q belongs to an already define query family, it would be added to a list of queries belonging to this query family;
   b. Otherwise,
      i. a new query family will be defined to which q may belong, and the new query family will be added to the set Q of queries;
      ii. If the query is a complex query, it would be added including the associated query/queries and the appropriate filters to the set Q of queries.

At the end of this phase, a set of query families will be defined, whereas for each query family, a set of specific queries will also be defined.

Step II—Data processing:

After identifying all query families, the data will be preprocessed in a way that will permit evaluating all the queries of the simple families of queries in an efficient way, e.g., enabling to evaluate all the queries in a family by performing $O(1)$ passes over the data available.

For example, a simple preprocessing would be to build a list of all the calls performed by each calling number. This process can be done by using Map-Reduce to create the desired lists, and to store the results in a new HDFS file.

In general, given the nature of simple queries, applying a simple preprocessing strategy in order to construct for each entity for which the features should be synthesized (e.g. the calling number), a list that comprises all the relevant information, will enable evaluating each query belonging to the simple query family in one pass over the data.

However, it should be noted that more complex preprocessing structures may be used in order to enhance the performance of evaluating the queries. For example, for each calling number, the associated CDRs list may be ordered by the CDRs starting time, or by using certain indices, such as by day of the week, hour of the day, etc. These lists may be generated and then stored at the beginning of the record/list to permit direct access to CDRs matching criteria, such as to find calls that took place between 8:00 to 10:00 in the morning, or to find calls that were held on Sunday.

Step III—Combination of Queries

Combining queries, is an optional step that may be used to enhance performance of the process disclosed herein. In some cases queries belonging to the same family can be combined together to reduce the computation effort. One such example is, if two queries use the same filter the filter may be tested only once per event (this is may be done for both, simple and complex filters). Moreover, if a filter is a subset of another filter, the less restricting filter may be tested only once, and the more restricting filter (being the subset of the other filter) would be applied in the event.

Many different techniques that are known in the art per se may be used for combining queries' filters (e.g. Rete based algorithms). However, it should be noted that the present invention is not restricted to the use of any such specific technique.

Step IV—Evaluation of Queries

A family of queries will be referred to as being solved, if all the queries that belong to that family of queries had been answered.

Preferably, in case of a simple family of queries, all the queries that belong to that family may be executed in one batch.

In case of a family of queries that has not been solved, the following steps may be followed:
  (i) Generating a family of queries F that depends only on family of queries which comprises queries that have already been solved;
  (ii) If F is not an empty group
    (a) Selecting a query q that belongs to family F of queries;
    (b) Deleting query q from family F;
    (c) Evaluating query q;
    (d) Repeat a-c until F is empty; and
    (e) Marking family F of queries as a solved.

It should be noted that the description provided hereinabove was brought merely to demonstrate the present invention. For example, several queries belonging to the same family may be solved in parallel, either by using parallel processing, or by using combination techniques that are known in the art such as the Rete algorithm.

In a Hadoop environment, the process provided by the present invention may comprises the following steps:
  (i) Storing all event data in HDFS files (e.g. files containing CDRs);

(ii) Per entity type for which the synthesis of new features should be performed (e.g., calling numbers), a map-reduce process is generated in order to reduce the required resources and to generate a record per entity instance (e.g. per specific calling number). In such a record, a list of relevant events/transactions should be included (e.g., all CDRs in which a certain subscriber is the calling number). In addition, an auxiliary processing may be applied to enable generating further structures for optimizing the evaluation (e.g., the order of the CDRs in the list by their call starting time). The results will be written to new HDFS files (referred to as "family data files");

(iii) Generating a second map-reduce process to enable the processing required for evaluating all queries included in a family of queries. In this step, all records of the data family files are reviewed, all the queries that belong to the family are evaluated for each record, once the results are obtained, the new features are synthesized and results are stored in a new set of HDFS files (referred to as "family results files". It should further be noted that the evaluation might be done while using different paradigms, e.g., in an expert-system like paradigm, using a Rete algorithm checking in the record on a per even/transaction basis, which of the queries are applicable and carry out the appropriate calculations. In a functional paradigm, there is a function associated with a query that would be fed by data retrieved from all the events/transactions associated with a record.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

In addition, it should be understood that although the examples provided in the present disclosure are mainly taken from the telecommunication field, still, the present invention is not limited to the telecommunication field of technology. It also encompasses non-telecommunication fields, such as for example the retail field, where the information may be derived from data on purchases history, or the utility field where the information may be derived from past data retrieved from readings of smart meters, and the like. The scope of the invention is limited only by the following claims.

The invention claimed is:

1. A method comprising:
  providing a simple query family that groups a plurality of first simple queries, the simple query family defined by:
    an information source for the first simple queries,
    an entity type for which features should be generated,
    first attributes that are available as filters, and
    second attributes that are usable for calculating new features;
  providing a complex query family that groups a plurality of first complex queries, the complex query family being dependent on the simple query family and the complex query family defined by:
    the information source for the first simple queries,
    the entity type for which the features should be generated, and third attributes that are available as filters that, at least in part, include results of one of the first simple queries;
performing the one of the first simple queries on the information source, by:
  identifying the simple query family,
  determining the entity type defined for the simple query family,
  preprocessing data in the information source defined for the simple query family to construct a list of data retrieved from the information source according to the entity type, and
  evaluating in one batch each first simple query in the simple query family including the one of the first simple queries, using the list of data;
obtaining results of the performing of the one of the first simple queries;
using the results to construct one of the third attributes that is available as a filter for the complex query family;
performing one of the first complex queries using the one of the third attributes.

2. The method of claim 1, further comprising a step of combining queries associated with a same query family.

3. The method of claim 1, wherein in a case that at least one query that belongs to a family of queries has not yet been solved, the method further comprises the steps of:
  (i) generating a family of queries F that depends only on a family of queries comprising queries that have already been solved;
  (ii) if F is not an empty group,
    a. Selecting a query q that belongs to family F of queries;
    b. Deleting query q from family F; and
    c. Solving query q;
  (iii) repeating steps a to c, until family F does not comprise any still unanswered queries.

4. The method of claim 1, wherein the information source is one or more Big Data systems storing data that relates to activities of a plurality of users at the Internet.

5. The method of claim 1, wherein the information source is one or more Big Data systems storing data that relates to details of voice calls or text messages associated with a plurality of users.

6. The method of claim 1, wherein the features are used in a process selected from among machine-learning, data mining, and artificial intelligence.

7. The method of claim 1, wherein the information source stores one of: social media data, communications data, consumption data, customer related data, and any combination thereof.

8. A non-transitory computer-readable storage media storing one or more sequences of instructions which when executed cause one or more processors to:
  provide a simple query family that groups a plurality of first simple queries, the simple query family defined by:
    an information source for the first simple queries,
    an entity type for which features should be generated,
    first attributes that are available as filters, and
    second attributes that are usable for calculating new features;
  provide a complex query family that groups a plurality of first complex queries, the complex query family being dependent on the simple query family and the complex query family defined by:
    the information source for the first simple queries,
    the entity type for which the features should be generated, and
    third attributes that are available as filters that, at least in part, include results of one of the first simple queries;
  perform the one of the first simple queries on the information source, by:
    identifying the simple query family,
    determining the entity type defined for the simple query family,
    preprocessing data in the information source defined for the simple query family to construct a list of data retrieved from the information source according to the entity type, and
    evaluating in one batch each first simple query in the simple query family including the one of the first simple queries, using the list of data;
  obtain results of the performing of the one of the first simple queries;
  use the results to construct one of the third attributes that is available as a filter for the complex query family;
  perform one of the first complex queries using the one of the third attributes.

9. The non-transitory computer-readable storage media of claim 8, wherein the information source is one or more Big Data systems comprises data that relates to activities of a plurality of users at the Internet and/or data that relates to details of voice calls or text messages associated with a plurality of users.

10. The non-transitory computer-readable storage media of claim 8, wherein the one or more sequences of instructions further comprise an instruction to combine queries associated with a same query family.

11. The non-transitory computer-readable storage media of claim 8, wherein the information source is one or more Big Data systems storing data that relates to activities of a plurality of users at the Internet.

12. The non-transitory computer-readable storage media of claim 8, wherein the information source is one or more Big Data systems storing data that relates to details of voice calls or text messages associated with a plurality of users.

13. The non-transitory computer-readable storage media of claim 8, wherein the features are adapted to be used in a process selected from among machine-learning, data mining, and artificial intelligence.

14. The non-transitory computer-readable storage media of claim 8, wherein the information source stores one of: social media data, communications data, consumption data, customer related data, and any combination thereof.

15. The method of claim 1, wherein:
  the information source stores call detail records (CDRs),
  the entity type for which the features should be generated is a calling number of a calling subscriber,
  the first attributes that are available as filters include day of the week that a call took place, and
  the second attributes that are usable for calculating new features include a duration of a telephone call.

16. The method of claim 1, further comprising:
  providing an additional simple query family that groups a plurality of second simple queries;
  wherein the third attributes that are available as filters for the complex query family further include results of one of the second simple queries; and
  wherein the one of the first complex queries is further performed using a second one of the third attributes that is constructed from results of the one of the second simple queries.

* * * * *